United States Patent
Kuo et al.

(10) Patent No.: US 6,238,600 B1
(45) Date of Patent: May 29, 2001

(54) METHOD OF MANUFACTURING A COMPOSITE OPTICAL ELEMENT

(75) Inventors: Meng-Shin Kuo, Taipei; Wei-Kuo Han, Hsinchu, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/404,499

(22) Filed: Sep. 23, 1999

(30) Foreign Application Priority Data

Aug. 18, 1999 (TW) .................................................. 88114083

(51) Int. Cl.$^7$ ...................................................... B29D 11/00
(52) U.S. Cl. .............................. 264/1.7; 264/2.5; 425/808
(58) Field of Search ............................... 264/1.1, 1.7, 1.8, 264/2.5; 425/808; 156/99

(56) References Cited

U.S. PATENT DOCUMENTS

| | | | |
|---|---|---|---|
| 3,903,218 | * 9/1975 | Humphrey ............................ | 425/808 |
| 4,179,484 | * 12/1979 | Neefe ..................................... | 264/2.5 |
| 4,543,146 | * 9/1985 | Petcen .................................... | 264/1.7 |
| 4,921,205 | * 5/1990 | Drew, Jr. et al. ..................... | 264/1.7 |

FOREIGN PATENT DOCUMENTS 60-205401 * 10/1985 (JP) .

* cited by examiner

*Primary Examiner*—Mathieu D. Vargot
(74) *Attorney, Agent, or Firm*—Jiawei Huang; J.C. Patents

(57) ABSTRACT

A method of manufacturing a composite optical element, in which method a lens material of plastic is formed on a lens. The lens has a first optical surface and a second optical surface, and a lateral edge tilted at an angle relative to the perpendicular center line of the lens. The lens material is formed into a lens medium which covers only the first optical surface and a portion of the lateral edge of the lens. A tight binding is then established between the lens and the lens medium, which is formed of the lens material.

16 Claims, 4 Drawing Sheets

METHOD OF MANUFACTURING A COMPOSITE OPTICAL ELEMENT

CROSS-REFERENCE TO RELATED APPLICATION

This application claims the priority benefit of Taiwan application serial no. 88114083, filed Aug. 18, 1999, the full disclosure of which is incorporated herein by reference.

BACKGROUND OF THE INVENTION

1. Field of the Invention

This invention relates to a method of manufacturing an optical element. More particularly, the present invention relates to a method for manufacturing a composite optical element.

2. Description of the Related Art

A composite optical element can constitute a transparent plastic material molded on a transparent optical element (such as glass or quartz). In general, from the optical point of view, aberrations exist on spherical lenses. If the surface of a lens is manufactured into a non-spherical shape, the formation of the spherical aberration will be reduced.

From the viewpoint of manufacturing process, the processing time and cost for non-spherical glass lenses are much higher than those for spherical glass lenses. Nevertheless, as molding technique further develops, plastic materials are more and more often being employed in the production of optical lenses. Workability of plastic is much better than that of glass, and it is cheaper to form a non-spherical lens from plastic than from glass. Moreover, plastic is lighter, has better tintability and shock resistance, and has a lower processing temperature than that of glass. But glass has better radiation resistance, durability and scratch resistance, and surface treatment is easier for glass than for plastic. Therefore, a composite lens that combines both glass and plastic materials will possess characteristics of both.

However, such a composite lens has two main problems. One is the big difference between the coefficients of thermal expansion of plastic and glass. The second one is that the binding between plastic and glass is not good enough. In general, delamination or cracking of the composite lens can occur under variation of temperature if the difference in the coefficients of thermal expansion of materials is too large. Moreover, molecular structures and functional groups cannot provide effective chemical bonds or physical entanglements between plastic and glass. Hence, the interface between glass and plastic lacks a strong binding.

In order to cope with the weaknesses described above, a layer of adhesive or coupling agent is coated between the plastic layer and the glass layer in the prior art such as the one disclosed in the U.S. Pat. No. 4,793,703. Alternatively, a coupling agent is added into the plastic layer such as the one disclosed in the Japanese Patent JP07306305. A holding force due to the encapsulation of the glass in the plastic may even be employed, such as those disclosed in the Japanese Patents JP59046601, JP01221701 and JP08190004. Addition of an adhesive or a coupling agent eventually increases the costs of material and equipment because an additional material is used. The environmental effect needs to be considered as well. The efficiency of composite lens production is low due to the many steps in the manufacturing process. Furthermore, the encapsulation method, which requires a plastic layer be extended from an optical surface of a glass lens over a lateral edge to the periphery of another optical surface, makes the structure of the molding apparatus more complicated.

SUMMARY OF THE INVENTION

In the light of the foregoing, the present invention provides a method of manufacturing a composite lens. In this method, only simple manufacturing process is required to produce a composite lens with good binding and optical quality.

The present invention provides a method of manufacturing a composite lens, wherein an adhesive or a coupling agent is not required to combine two lenses of different materials together, and hence, the manufacturing process can be simplified.

The present invention provides a method of manufacturing a composite lens, wherein the lateral edge of the lens is tilted at an angle θ relative to the perpendicular center line of the lens. Thus, the formed plastic lens can hold the lens tightly, without separation. This is unlike the prior art in which the lens is tightly encapsulated, and hence, the structure is more complicated.

The method of manufacturing a composite lens disclosed in the present invention is described as follows.

A positioning ring is placed in a molding apparatus, or the positioning ring and the molding apparatus can be formed as a whole. The positioning ring has an inner edge, and the inner edge is tilted relative to the geometric center line of the positioning ring. A lens is placed inside the positioning ring with the inner edge of the positioning ring jammed against a lateral edge of the lens. The tilt angle of the inner edge of the positioning ring is designed to match the lateral edge of the lens. In addition, the thickness of the positioning ring is less than the thickness of the lens. A lens material is placed in the molding apparatus and covers the lens and the positioning ring. An upper mold is then placed on top of the lens material and the position of the upper mold is adjusted. A high temperature process is performed during which the lens material is hardened, and a composite lens is formed. The lens material can be a plastic material.

The lens described above has a first optical surface and second optical surface, and a lateral edge tilted at an angle relative to the perpendicular center line of the lens, which gives an outer edge diameter of the second optical surface smaller than the diameter of outer edge of the first optical surface. Moreover, a chamfer can be made at the junction between the first optical surface and the lateral edge of the lens, in accordance with the perpendicular center line of the lens. Thus, the breakage and cracking of the lens is prevented.

A positioning ring is placed in a molding apparatus, or the positioning ring and the molding apparatus can be formed as a whole. The positioning ring has an inner edge, and the inner edge is tilted relative to the geometric center line of the positioning ring. A lens is placed inside the positioning ring with the inner edge of the positioning ring jammed against a lateral edge of the lens. The tilt angle of the inner edge of the positioning ring is designed to match the lateral edge of the lens. In addition, the thickness of the positioning ring is less than the thickness of the lens. An upper mold is placed above the lens and the position of the upper mold is adjusted. An injection molding process is then performed during which a lens material is injected between the positioning ring, the lens and the upper mold, and hence, a composite lens is formed.

When a thickness of the lens is greater than a predetermined value, a plurality of guide rods can be placed on the positioning ring. Each of the guide rods is in contact with a portion of the lateral edge of the lens in order to secure the lens. The guide rods are placed equidistant from each other around the lens.

As the lateral edge of the lens is tilted at an angle relative to the perpendicular center line of the lens, the formed plastic lens can hold the glass lens tightly, without separation, and results in a good binding. The manufacturing steps are simple so that the cost of composite lens production can be reduced and the optical quality is maintained.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENT

Figure 1:
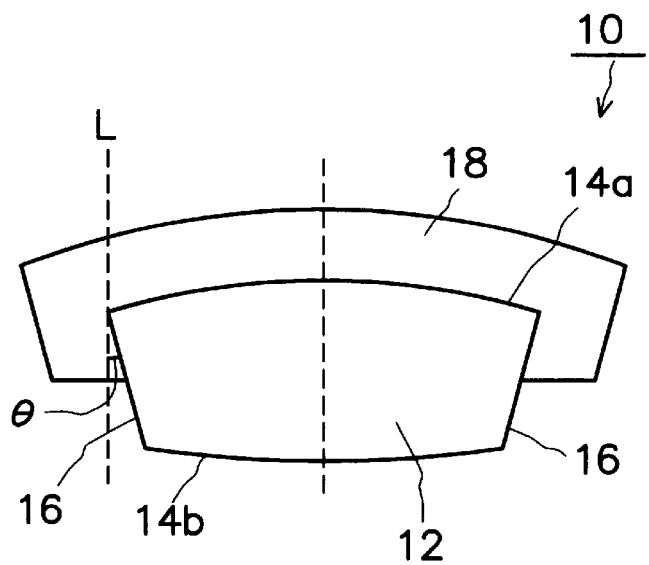
FIG. 1 shows a schematic, cross-sectional drawing of a composite lens fabricated in accordance with the manufacturing process of the present invention.

Reference is made to FIG. 1, by which present invention introduces a method of manufacturing a composite lens 10. A lens material (not shown) is formed on a lens 12. The lens 12 has a first optical surface 14a and a second optical surface 14b, and a lateral edge 16 tilted at an angle θ relative to the perpendicular line L. As shown in the figure, the lens material is formed into a lens medium 18 and covers only the first optical surface 14a and a portion of the lateral edge 16 of the lens 12. Thus, the lens medium 18, which is made of the lens material, is tightly combined with the lens 12.

FIGS. 2A to 2F illustrate examples of types of lenses applicable to the manufacturing process according to the present invention. Similar members are represented by same index numbers. The only difference is the curvatures of optical surfaces.

The lens 20 shown in FIGS. 2A to 2F can be made of glass materials and has a first optical surface 22, a second optical surface 24, and a lateral edge 26. Optical surfaces 22 and 24 can be designed as spherical surfaces, with the centers of curvature of optical surfaces 22, 24 on the same lens axis. As shown in the figures, the lateral edge 26 of the lens 20 is tilted at an angle θ relative to the perpendicular line in accordance with the present invention. The later-formed plastic lens thus covers the first optical surface 22 and a portion of the lateral edge 26 of the lens 20. Because the lateral edge 26 of the lens 20 is tilted at an angle θ relative to the perpendicular line, the formed plastic lens can hold the glass lens 20 and results in a good binding.

Moreover, when the tilt angle θ is too large, a chamfer can be made at the junction between the first optical surface 24 and the lateral edge 26 of the lens 20, in accordance with the perpendicular line, shown as 28, 28' in the figures. Thus, the cracking at the junction between the optical surface 24 and the lateral edge 26 of the lens 20 is prevented.

The method of manufacturing a composite lens in accordance with the present invention is specifically described as follows.

Figure 3A:
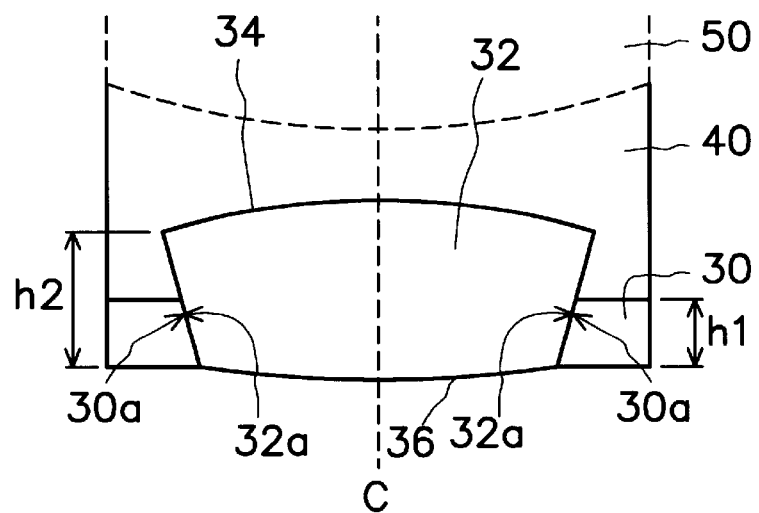
FIG. 3A schematically illustrates the manufacturing procedures for a composite lens in accordance with a preferred embodiment of the present invention.
Figure 2A:
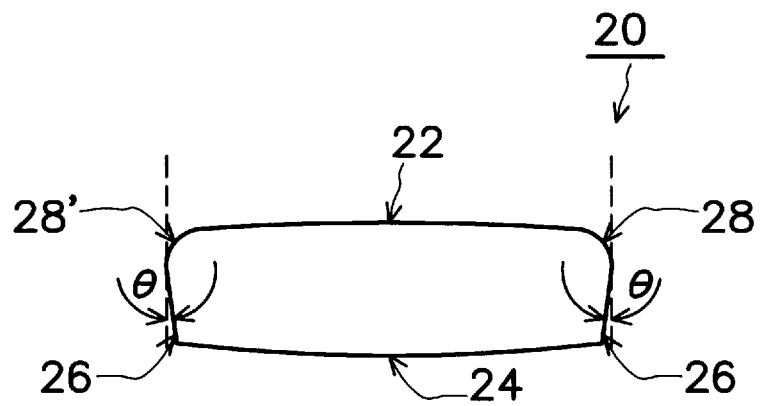
FIGS. 2A to 2F schematically illustrate examples of types of lenses applicable to the manufacturing process of the present invention.
Figure 2B:
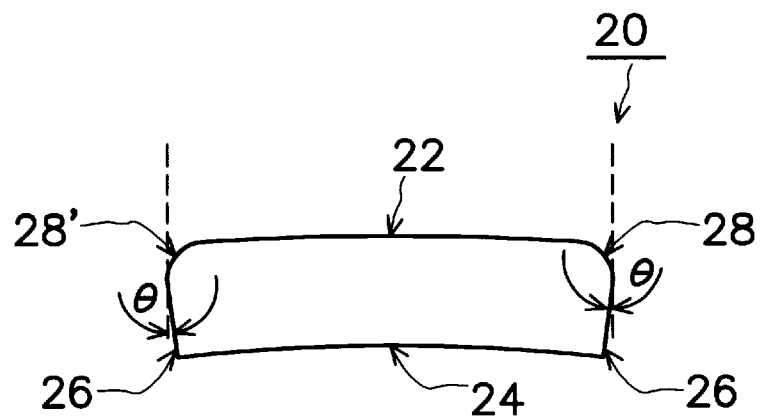
Figure 2C:
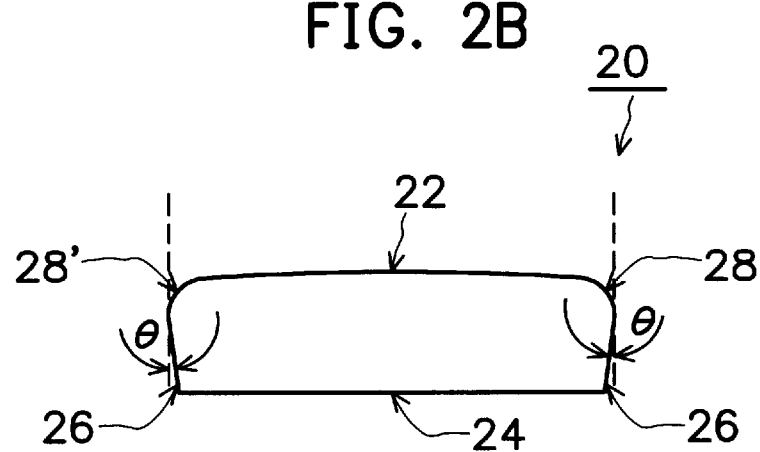
Figure 2D:
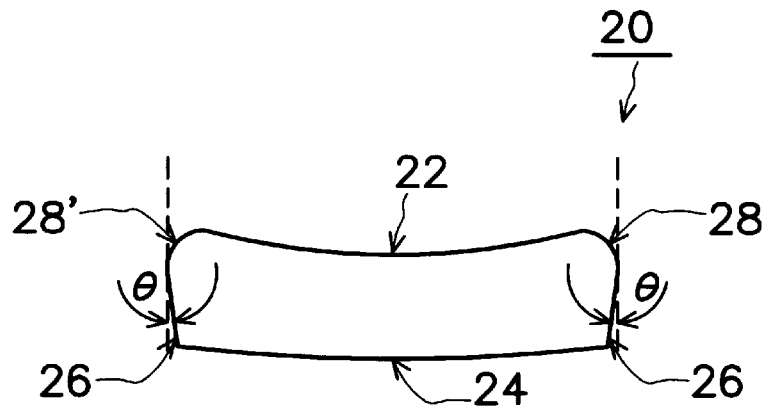
Figure 2E:
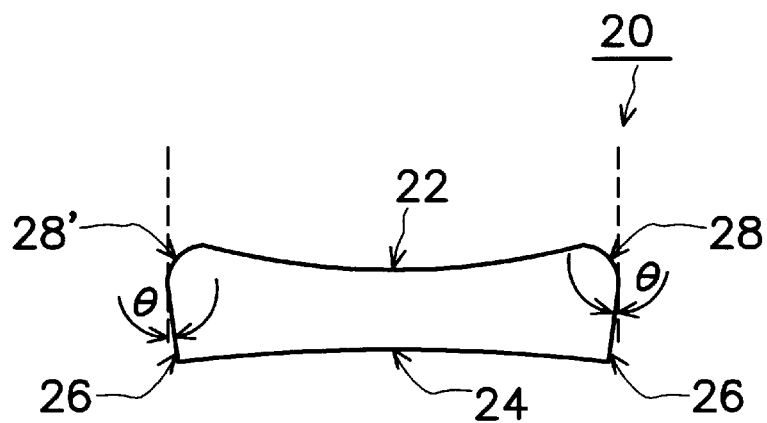
Figure 2F:
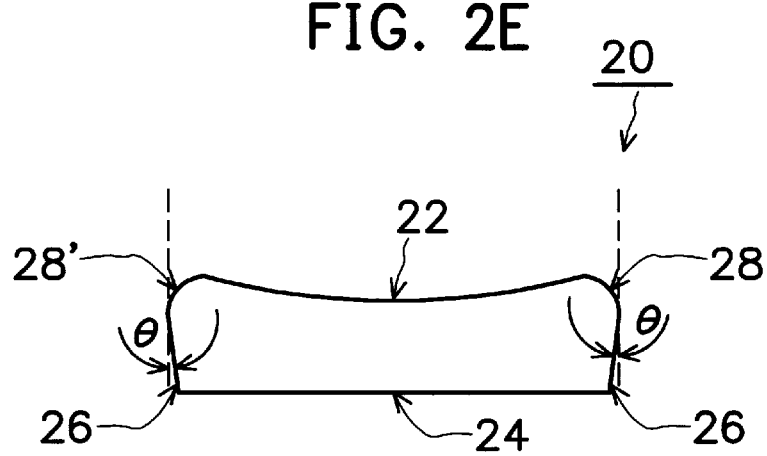

Reference is made to FIG. 3A, wherein the lens shown in FIG. 2A is used as an example. First, a positioning ring 30 is placed in a molding apparatus, or a molding apparatus in which a positioning ring 30 and a lower mold are formed as a whole is employed. The positioning ring 30 has an inner edge 30a, and the inner edge 30a is tilted relative to the geometric center line C of the positioning ring 30. A lens 32 is then placed inside the positioning ring 30 with the inner edge 30a of the positioning ring 30 jammed against a lateral edge 32a of the lens 30. Because the tilt angle of the inner edge 30a of the positioning ring 30 is designed to match the lateral edge 32a of the lens 32, the lateral edge 32a of the lens 32 can be tightly secured to the inner edge 30a of the positioning ring 30. Thus, the lens 32 is not displaced during the molding process, and hence, deviation is prevented.

In addition, the thickness h1 of the positioning ring 30 is less than the thickness h2 of the lens 32. Therefore, the later-formed plastic lens will not envelop the second optical surface 34 of the lens 32.

Figure 3B:
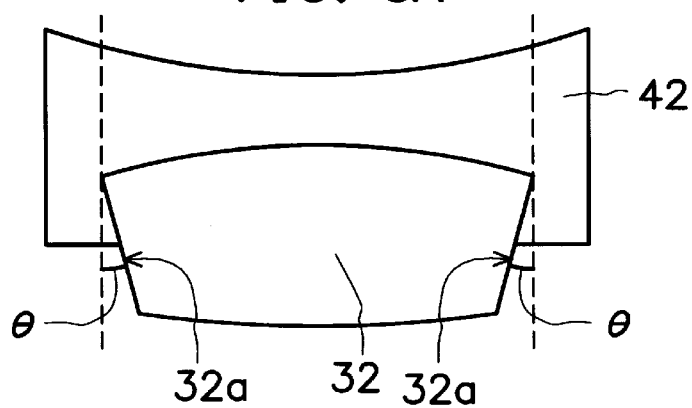
FIG. 3B schematically illustrates a cross-section of a composite lens fabricated in accordance with a preferred embodiment of the present invention.

A lens material 40, for example, a thermosetting plastic material, is placed in the molding apparatus and covers the lens 32 and the positioning ring 30. An upper mold 50 is then placed on top of the lens material 40. The position of the upper mold 50 is adjusted, which determines the dimensions of the later-formed lens. Finally, a high temperature process is performed during which the lens material 40 is transformed into a plastic lens 42, and a composite lens is formed as shown in FIG. 3B.

As described above, the lateral edge 32a of the lens 32 is tilted at an angle θ relative to the perpendicular line. Thus, the formed plastic lens 42 can hold the glass lens 32 tightly, without separation, and hence, results in a good binding. Furthermore, the manufacturing steps are simple so that the cost can be reduced and the optical quality of the composite lens is maintained.

Figure 4A:
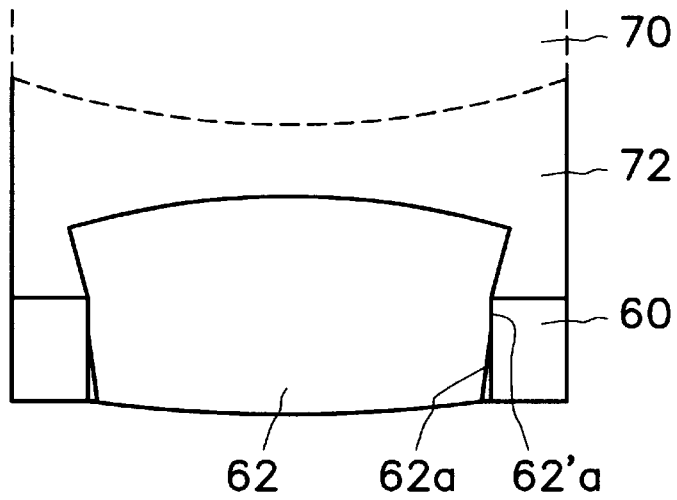
FIG. 4A shows the locations of the positioning ring and the lens during the formation of a plastic lens under an injection molding in accordance with the manufacturing process of the present invention.
Figure 4B:
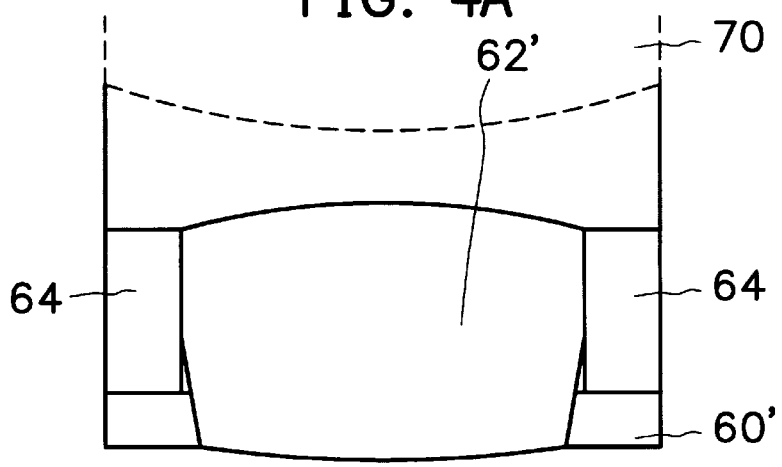
FIG. 4B shows the locations of the positioning ring and the relatively thick lens during the formation of a plastic lens under an injection molding in accordance with the manufacturing process of the present invention.

As illustrated in FIGS. 4A and 4B, the injection molding method has to be used for manufacturing a plastic lens when a thermoplastic material is employed. The difference with respect to the former method is that a lens material need not be placed in the molding apparatus first. Reference is made to FIG. 4A, wherein a lens 62 is placed inside a positioning ring 60'. Then, an upper mold 70 is placed above the lens 62 and the position of the upper mold 70 is adjusted. By means of the injection molding method, the lens material is injected between the positioning ring 60', the lens 62 and the upper mold 70 to form a composite lens.

Figure 4C:
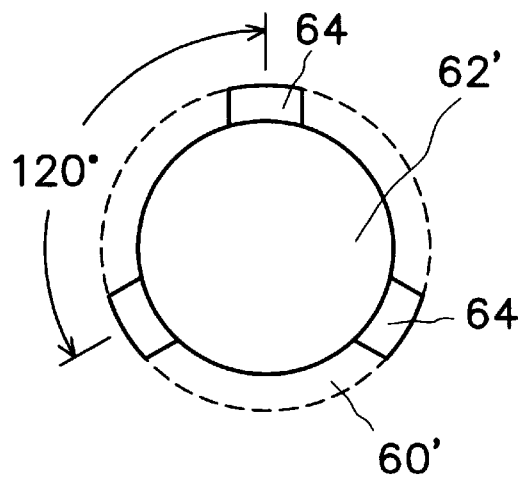
FIG. 4C illustrates the schematic top view of the structure shown in FIG. 4B, in which the relative locations of the guide rods and the lens are drawn.

If the lens is relatively thick, as the one 62' shown in FIG. 4B, a plurality of guide rods 64 can be placed on the positioning ring 60'. The optimum number of guide rods 64 is three, as shown in FIG. 4C, which illustrates the top view of the structure shown in FIG. 4B, with each guide rod 64 separated by 120 degrees. Thus, the lens 62' is held by the positioning ring and the guide rods 64 during the injection molding process. This prevents the displacement of the lens 62' during the injection of the plastic lens. Similarly, the lateral edge 62a of the lens 62 is tilted at an angle θ relative to the perpendicular line. Thus, the formed plastic lens 72 can hold the glass lens 62 tightly, without separation, and hence, results in a good binding. Furthermore, the manufacturing steps are simple, so that the cost can be reduced and the optical quality of the composite lens is maintained.

Based on the foregoing, performance and other advantages of the method to manufacture a composite lens according to the present invention over the prior art comprise the following:

Only simple manufacturing steps are required to produce a composite lens with good binding and optical quality.

An adhesive or a coupling agent is not required to combine two lenses of different materials together, and hence, the manufacturing process can be simplified.

The lateral edge of the lens is tilted at an angle relative to the perpendicular center line of the lens. Thus, the formed plastic lens can hold the glass lens tightly, without separation. The structure is simpler and easier to manufacture than the prior art, and hence, the cost can be reduced.

Based on the foregoing, while the present invention has been disclosed with reference to the preferred embodiments described above, the embodiments are not intended to limit the present invention in any way. It will be apparent to those skilled in the art that various modifications and variations can be made to the structure according to the present invention without departing from the scope or spirit of the invention. In view of the foregoing, it is intended that the present invention covers modifications and variations of this invention provided they fall within the scope of the following claims and their equivalents.

What is claimed is:

1. A method to manufacture a composite lens, comprising:

placing a positioning ring with an inner edge in a molding apparatus, wherein the inner edge is tilted relative to a geometric center line of the positioning ring;

placing a lens inside the positioning ring, with the inner edge of the positioning ring jammed against a portion of a lateral edge of the lens, wherein a tilt angle of the inner edge is designed to match the lateral edge of the lens, and a thickness of the positioning ring is less than a thickness of the lens;

placing a lens material in the molding apparatus and covering the lens and the positioning ring;

placing an upper mold on top of the lens material and adjusting the position of the upper mold; and performing a high temperature process to heat the lens material during which the lens material is hardened; and removing the positioning ring to form a composite lens.

2. The method to manufacture a composite lens according to claim 1, wherein the positioning ring and the molding apparatus are formed as a whole.

3. The method to manufacture a composite lens according to claim 1, wherein the lens has a first optical surface and a second optical surface, and a lateral edge tilted at an angle relative to a perpendicular center line of the lens, which makes an outer edge diameter of the second optical surface smaller than an outer edge diameter of the first optical surface.

4. The method to manufacture a composite lens according to claim 1, further comprising formation of a chamfer at a junction between the first optical surface and the lateral edge of the lens, in accordance with the perpendicular center line of the lens.

5. The method to manufacture a composite lens according to claim 1, wherein a material of the lens is a glass material.

6. The method to manufacture a composite lens according to claim 1, wherein a lens material is a plastic material.

7. A method to manufacture a composite lens, comprising:

placing a positioning ring with an inner edge in a molding apparatus, wherein the inner edge is tilted relative to a geometric center line of the positioning ring;

placing a lens inside the positioning ring with the inner edge of the positioning ring jammed against a portion of a lateral edge of the lens, wherein a tilt angle of the inner edge is designed to match the lateral edge of the lens, and the thickness of the positioning ring is less than the thickness of the lens;

placing an upper mold on top of the lens and adjusting the position of the upper mold;

performing an injection molding process during which a lens material is injected between the positioning ring, the lens and the upper mold; and removing the positioning ring to form a composite lens.

8. The method to manufacture a composite lens according to claim 7, wherein the positioning ring and the molding apparatus are formed as a whole.

9. The method to manufacture a composite lens according to claim 7 further comprising the following step when an injection molding process is performed:

placing a plurality of guide rods on the positioning ring and in contact with a portion of the lateral edge of the lens in order to secure the lens.

10. The method to manufacture a composite lens according to claim 9, wherein the guide rods are placed equidistant from each other around the lens.

11. The method to manufacture a composite lens according to claim 10, wherein an optimum number of the guide rods is three, separated from each other by 120 degrees.

12. The method to manufacture a composite lens according to claim 7, wherein the lens has a first optical surface and a second optical surface, and a lateral edge tilted at an angle relative to a perpendicular center line of the lens, which gives an outer edge diameter of the second optical surface that is smaller than an outer edge diameter of the first optical surface.

13. The method to manufacture a composite lens according to claim 12, further comprising formation of a chamfer at a junction between the first optical surface and the lateral edge of the lens, in accordance with a perpendicular center line of the lens.

14. The method to manufacture a composite lens according to claim 7, wherein a material of the lens is a glass material.

15. The method to manufacture a composite lens according to claim 7, wherein a lens material is a plastic material.

16. A method to manufacture a composite lens, comprising:

placing a lens material on a lens retained by a positioning ring, wherein the lens has a first optical surface and a second optical surface, and a lateral edge tilted at an angle relative to a perpendicular center line of the lens and the first optical surface entends larger than the second optical surface;

forming the lens material into a lens medium which covers only the first optical surface and a portion of the lateral edge of the lens; and removing the positioning ring.

* * * * *